(12) United States Patent
Walker et al.

(10) Patent No.: US 12,540,240 B2
(45) Date of Patent: Feb. 3, 2026

(54) PHOTO-CURABLE POLYIMIDE-LIKE MATERIALS, AND METHOD OF MAKING

(71) Applicant: Intrnls, Inc., Wales, WI (US)

(72) Inventors: David A. Walker, Evanston, IL (US); Matthew N. Pearlson, Wales, WI (US)

(73) Assignee: Intrnls, Inc., Wales, WI (US)

( * ) Notice: Subject to any disclaimer, the term of this patent is extended or adjusted under 35 U.S.C. 154(b) by 85 days.

(21) Appl. No.: 18/653,643

(22) Filed: May 2, 2024

(65) Prior Publication Data
US 2024/0368392 A1 Nov. 7, 2024

Related U.S. Application Data

(60) Provisional application No. 63/463,523, filed on May 2, 2023.

(51) Int. Cl.

| | |
|---|---|
| *C08L 33/26* | (2006.01) |
| *B29B 13/02* | (2006.01) |
| *B29C 64/129* | (2017.01) |
| *B29K 33/00* | (2006.01) |
| *B29K 79/00* | (2006.01) |
| *B29K 105/00* | (2006.01) |
| *B33Y 70/00* | (2020.01) |
| *C08G 73/10* | (2006.01) |

(52) U.S. Cl.
CPC ............. *C08L 33/26* (2013.01); *B29B 13/02* (2013.01); *B33Y 70/00* (2014.12); *C08G 73/1003* (2013.01); *B29C 64/129* (2017.08); *B29K 2033/26* (2013.01); *B29K 2079/08* (2013.01); *B29K 2105/0002* (2013.01); *B29K 2105/0091* (2013.01); *C08L 2205/04* (2013.01)

(58) Field of Classification Search
CPC ... B29B 13/02; B29C 64/129; B29K 2033/26; B29K 2105/0091; B29K 2105/0002; C08L 2205/04
See application file for complete search history.

(56) References Cited

U.S. PATENT DOCUMENTS

| | | | |
|---|---|---|---|
| 2014/0272358 A1* | 9/2014 | Meador | C08G 73/1035 521/115 |
| 2015/0141544 A1* | 5/2015 | Meador | C08G 73/106 521/183 |
| 2021/0115279 A1* | 4/2021 | Rau | C09D 11/102 |

* cited by examiner

*Primary Examiner* — Nahida Sultana
(74) *Attorney, Agent, or Firm* — David H. Judson

(57) ABSTRACT

A method of making a polyimide (PI)-based material. In one embodiment, the method begins by dispersing a polyamic acid (PAA) oligomer and photo-initiator into a photo-reactive monomer to form a liquid resin. In contrast to the above-described prior art, the liquid resin is substantially devoid of any non-reactive solvents. Electromagnetic radiation is then applied (e.g., in a 3D printing operation) to solidify the liquid resin and to substantially form a interpenetrating polymer network (IPN) in which the PAA oligomer is entangled within the network formed by the photo-reactive monomer but remains substantially independent and un-crosslinked from the PAA oligomer. Thereafter, the PAA-based IPN is thermally cycled to form a polyimide-based IPN.

12 Claims, 2 Drawing Sheets

PHOTO-CURABLE POLYIMIDE-LIKE MATERIALS, AND METHOD OF MAKING

BACKGROUND OF THE INVENTION

This disclosure relates generally to additive manufacturing, (UV-based 3D printing) polyimide-based materials.

Polyimides (PIs), with their high heat-resistance, enjoy diverse applications in roles demanding rugged organic materials, such as high temperature fuel cells, displays, and various military roles. 3D printing of polyimides has traditionally been limited to extrusion technologies, such fused deposition modeling (FDM), as they are thermoplastic polymers. By utilizing higher temperature heaters, materials such as Ultem (polyetherimide) are printable. While there is great demand for this technology, as there are no other reliable mechanisms to print this robust material, FDM as a printing technology has numerous setbacks. Low throughput, limited resolution, surface roughness, anisotropic mechanical properties owing to lower intra-layer adhesion and internalized micro-defects are all well documented challenges for the technology class. Alternatively, vat photopolymerization (VPP) technologies offer solutions to all of the above challenges. Digital Light Patterning (DLP) projection technologies (including stitched and multi-projector DLP) as an optical patterning technology drastically improve addressable print areas and throughput. LCD, DLP, and laser scanning based technologies routinely reach pixel resolution capabilities ranging from 20-50 µm. Higher optical patterning resolution, in combination with shorter z-layer heights and patterning techniques such as gray scaling and dithering, have drastically increased surface fidelity of prints. And lastly, continuous print modalities have resolved issues relating to intra-layer adhesion and internalized microdefects often present in filament and powder based systems.

Until recently, the number of attempts to generate a polyimide material via VPP has been limited. Long and co-workers published one of the earliest studies, in 2017 and 2018, documenting the "printing" of a polyimide structure. In one study, an organo-gel of polyamic acid (PAA, a chemical precursor to forming polyimide) was printed. This organo-gel was then annealed at 400° C. to remove the PAA components and to convert the PAA to a PI (the thermal conversion of PAA to PI is a well-known process utilized in various coating technologies). In this approach, the thermoplastic polyamic acid was cross-linked through photo-active methacrylates that formed hydrogen/ionic bonds with the PAA polymer backbone. Unfortunately, due to solubility challenges of PI systems and viscosity requirements of most VPP printers (maximum viscosities of 2,000 cps is common, while viscosities of 100-500 cps being ideal), the 3D printing resins in this study only contained ~20 wt % PAA precursor material. Resultingly, a large amount of mass loss and shrinkage of ~50% were observed during the annealing process. Additionally, a high temperature anneal of 400° C. was utilized to burn off the non-PAA/PI components, viz., non-reactive solvent. Unfortunately, the burn out of so much organic matter resulted in a large amount of carbon residues and ash contents remaining, hence the part emerged as black instead of the classical transparent amber coloration associated with most polyimides.

SUMMARY OF THE INVENTION

The techniques of this disclosure address the above-described problems and provide for an improved method of making a polyimide (PI)-based material. In one embodiment, the method begins by dispersing a polyamic acid (PAA) oligomer and photo-initiator into a photo-reactive monomer to form a liquid resin. In contrast to the above-described prior art, the liquid resin is substantially devoid of any non-reactive solvents. Electromagnetic radiation is then applied (e.g., in a 3D printing operation) to solidify the liquid resin and to substantially form a PAA-based interpenetrating polymer network (IPN) in which the PAA oligomer is entangled within the network formed by the photo-reactive monomer but remains substantially independent and un-crosslinked from the PAA oligomer. Thereafter, the PAA-based IPN is thermally cycled to higher temperatures to convert the PAA-based IPN into a polyimide-based IPN.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the disclosed subject matter and the advantages thereof, reference is now made to the following descriptions taken in conjunction with the accompanying drawings, in which.

DETAILED DESCRIPTION OF THE INVENTION

As used herein, the following terms have the following meanings:

A "polyamic acid" or "PAA" is a polyimide precursor polymer with amide and carboxylic functional groups. As used herein, a PAA may refer to either a polyamic acid or a salt of a polyamic acid. A PAA precursor may be characterized as aliphatic, semi-aromatic, and/or aromatic in nature, and many such back-bone structures are known.

A "Interpenetrating Polymer Network" or "IPN" is a polymer comprising two or more networks that are at least partially interlaced on a polymer scale but not covalently bonded to each other (or, if they are, they are so to a limited extent). The network cannot be separated unless chemical bonds are broken. Stated another way, IPNs are a class of polymer network comprising two or more polymer networks that are intercalated to each other without the formation of covalent bonds. A "semi-IPN" or "SIPN" is a polymer blend comprising one or more polymer networks and one or more linear or branched polymers characterized by the penetration on a molecular scale of at least one of the networks by at least some of the linear or branched macromolecules. A SIPN may be distinguished from an IPN because the constituent linear or branched macromolecules can, in principle, be separated from the constituent polymer network(s) without breaking chemical bonds.

A "polyimide" or "PI" is a synthetic resin in which the polymer units are linked by imide groups.

"VPP" or vat photopolymerization refers to a type of additive manufacturing that uses light to induce controlled polymerization.

Figure 1:
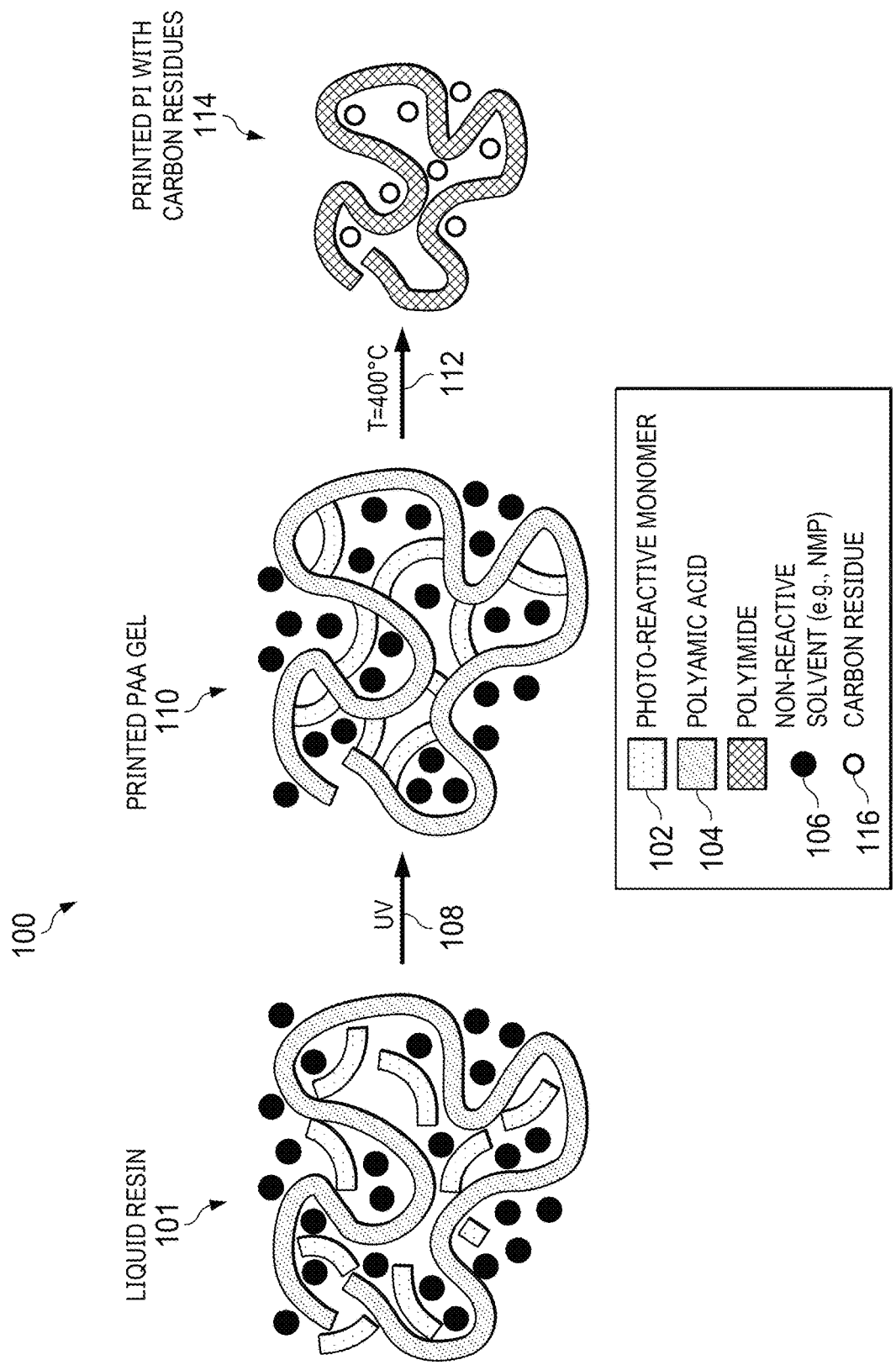
FIG. 1 depicts a representative example of a prior art method for making a polyimide-based material.

By way of background, FIG. 1 is a simplified depiction of a known method 100 for the additive manufacturing of PI is shown. In this approach (described in Long et al.), a liquid resin 101 comprising approximately 10% acrylic monomer 102, 20% PAA 104, and 70% non-reactive solvent 106 is UV-printed 108 (e.g., using a VPP printer) to form a printed organo-gel 110. A representative solvent is N-Methyl-2-pyrrolidone (NMP). In particular, the thermoplastic polyamic acid is cross-linked through pendent photo-active methacrylate moities that form hydrogen/ionic bonds with the PAA polymer backbone. At step 112, this organo-gel is then annealed at approximately 400° C. to remove the PAA components and to convert the PAA to a PI, namely, the final printed PI material 114. This latter step is a well-known process utilized in various coating technologies. As also depicted, annealing pyrolyzes the non-reactive solvent 106 to carbon residue 116. Unfortunately, due to solubility challenges of PI systems and viscosity requirements of most VPP printers (maximum viscosities of 2,000 cps is common, while viscosities of 100-500 cps is ideal), the 3D printing resins in this example only contain approximately 20 wt % PAA precursor material. Resultingly, a large amount of mass loss and shrinkage of approximately 50% are observed during the annealing process. Additionally, as described, a high temperature anneal of 400° C. is utilized to burn off the non-PAA/PI components. Unfortunately, the burn out of so much organic matter results in a large amount of carbon residues and ash contents remaining, hence the part emerges as black instead of the classical transparent amber coloration associated with most polyimides.

The technique herein addresses the above-described deficiencies. In one embodiment, the approach herein is adapted to be carried out at least in part on a UV-curable 3D printer, such as described in U.S. Publication Nos. 2018/0162052, and 2022/0371272, to Pearlson. These publications describe machines that print highly viscose resins. The particular architecture of the printer, however, is not a limitation. To address the problems of the known techniques as described above, the subject matter provides for high-viscosity resin formulations and are adapted to be printed on machines of this type.

To that end, and in one representative embodiment, PI resin formulations as used herein are prepared as follows. Initially, synthetic materials for PAA that are known to convert to PI at lower temperatures (e.g., below 200° C.) are obtained. Representative (but non-limiting) commercially-available materials of this type include the Skybond™ product line available from Industrial Summit Technology, USA. More generally, these constituent molecules can be made from a large number of available alicylic dianhydrides and diamines. As needed, the PAA compounds are then synthesized and dispersed in a photo-reactive monomer solvent. This approach improves upon the techniques depicted in FIG. 1 and described above, which as noted relied on PAA solids pre-dispersed in large quantities of a non-reactive solvent (NMP). As noted, and as a result, in the known technique the print process resulted in an organo-gel swollen by the solvent, which had to be burned off. By replacing this solvent with a substantially 100% photo-reactive monomer as contemplated by this disclosure, during the 3D print the PAA oligomers are encased in a polymeric matrix independent of the PAA to generate a interpenetrating polymer network (IPN). This approach also enables control of the molecular weight (MW) of the synthesized PAA, as well as the ultimate loading of PAA in the photo-reactive monomer solvent.

Figure 2:
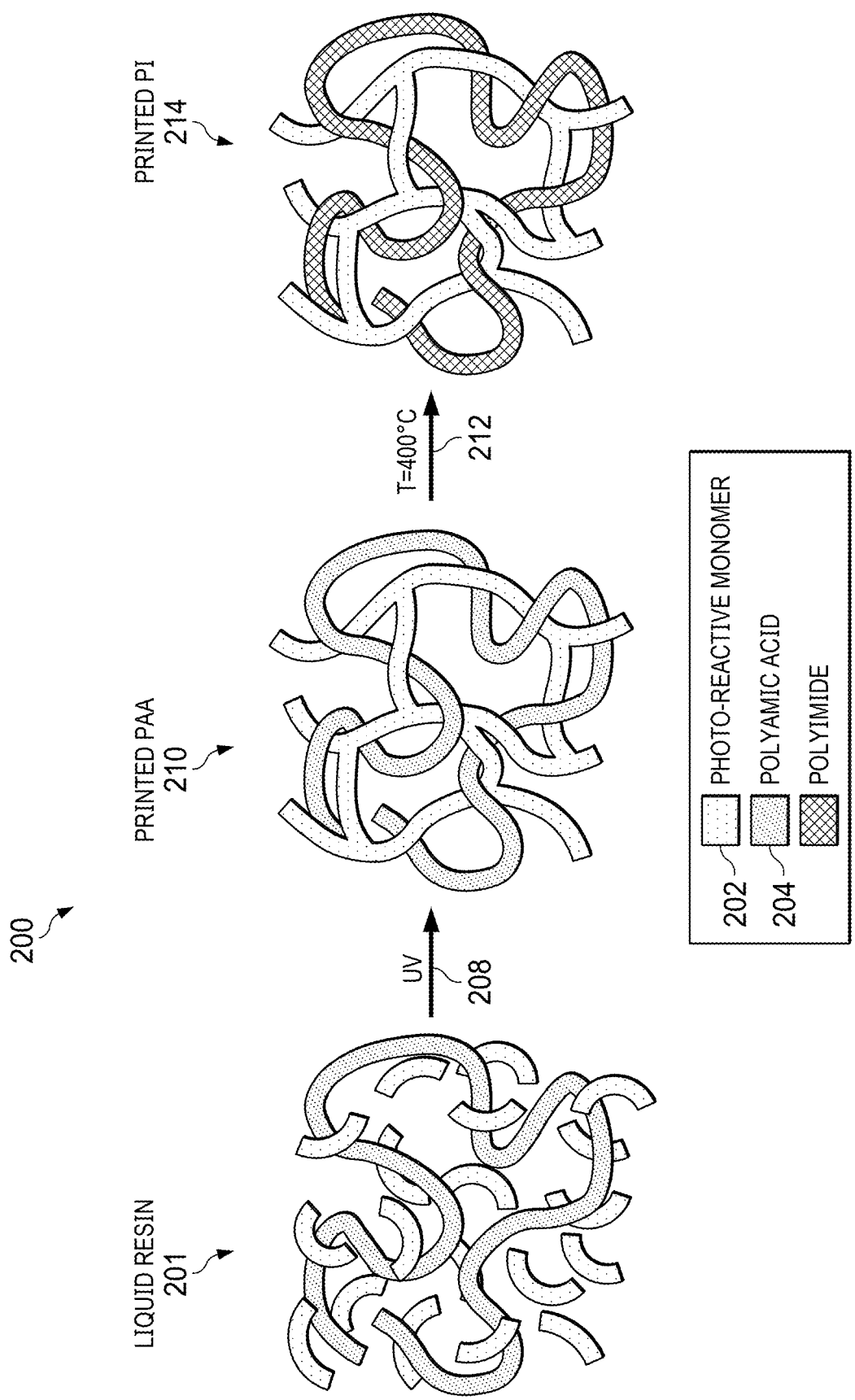
FIG. 2 depicts a preferred method for making the polyimide-based material according to this disclosure.

The method herein 200 is depicted in FIG. 2. Similar to the approach shown in FIG. 1, the process involves three (3) basic steps, but with a different liquid resin and lower temperatures. In particular, in this approach a polyamic acid (PAA) oligomer 204 (together with a suitable photo initiator) is dispersed into a photo-reactive monomer 202 to form the liquid resin 201; in contrast to the approach depicted in FIG. 1, however, here the liquid resin 201 is substantially devoid of any non-photo-reactive solvents. Further, and once again as compared to the approach in FIG. 1, here the loading of the PAA in the liquid resin is much higher, preferably about 70% by weight, such that the photoreactive monomer constitutes about 30% by weight. At step 208, electromagnetic radiation, such as UV light, is applied to initiate photopolymerization of the photo-reactive monomer and to solidify the liquid resin, thereby forming a PAA-based IPN (or semi-IPN) 210 in which the polyamic acid oligomer 204 is entangled within the network formed by the photo-reactive monomer 202. Then, and at step 212, the PAA-based IPN 210 is thermally-cycled at approximately 200° C. to convert the PAA network to a PI network, depicted here as the final printed PI-based IPN material 214. This latter step is carried out at much lower temperatures as compared to FIG. 1, and the resulting material 214 exhibits much lower shrinkage. Of course, because non-photo-reactive solvents are not used during this process, there are far fewer carbon residues or other such by-products present in the final product.

The above-described approach of loading approximately 70 wt % PAA and photopolymerizing the remaining 30 wt % solvating molecules, provides for creation of highly-viscose, but low shrinkage, PI materials. The process is carried out, preferably at sub 200° C. temperatures at or below 200° C. Optionally, the thermal conversion of PAA to PI may be conducted at temperature of 250° C. or 300° C. depending on the exact photoreactive monomer utilized. By avoiding pyrolysis of the photo-reactive component, the strength of the material is maintained while minimizing shrinkage during the conversion process.

Generalizing, the above-described technique to produce additively manufactured polyimide uses significantly higher loadings of PAA oligomers preferably solvated by only reactive acrylic monomers. Upon irradiation with UV light, and in one preferred embodiment, the acrylic phase causes a solidification of the resin and forms an semi-interpenetrating polymer network (semi-IPN) between the acrylic and polyamic acid components. A low temperature annealing process is then used to convert the PAA to PI, while retaining and avoiding the pyrolysis of the acrylic components. This, in turn, leads to the ability to maintain printed dimensional accuracy and minimize shrinkage.

Enabling Technologies

As noted above, method steps herein may be practiced in association with an additive manufacturing process, e.g., using a 3D printer. Vat photopolymerization manufacturing methods and systems are well-known. In particular, stereo-lithography is a known technique for making solid objects by successively "printing" thin layers of a curable material, e.g., a radiation-curable material, one on top of the other. To this end, a programmed movable spot beam of light (e.g., UV) shining on a surface or layer of radiation-curable liquid is used to form a solid cross-section of the object at the surface of the liquid. The object is then moved, in a programmed manner, away from the liquid surface by the thickness of one layer and the next cross-section is then formed and adhered to the immediately preceding layer defining the object. This process is continued until the entire object is formed. Using this printing approach, many different types of object forms can be created using the computer to help generate the programmed commands and to then send the program signals to the stereolithographic object forming subsystem.

Conventional vat photopolymerization techniques typically involve producing layers of an article by additively combining cross-sectional areas of a given height or layer thickness. Layers are deposited by repeatedly raising and dipping an element into a large vat of material, with the layers then built on an XY plane, with height in the Z plane.

Although not a requirement, an additive manufacturing method and apparatus may use a photo-curable resin foam as the source material for the printer. Such a photo-curable foam could be produced by adding a foaming additive (gas producing compound, glass-microspheres, etc.) to the photo resin described herein. The printing method at a foam layer may be implemented in a top-down or bottom-up manner as well. In an example embodiment, the SLA apparatus comprises a radiation source (e.g., DLP, laser, electron beam (EB), x-ray, scanner, etc.), a movement control mechanism (e.g., a stepper motor) that moves a build platform vertically up and down within a tank that holds the photopolymer resin, and a sweeper (also known as a "recoater" blade) that sweeps horizontally. These elements are used to print a part. An electronic control system is used to control the operation of the printer. To this end, one or more computers (e.g., servers, network hosts, client computers, integrated circuits, microcontrollers, controllers, field-programmable-gate arrays, personal computers, digital computers, driver circuits, or analog computers) are programmed or specially adapted to perform control tasks. Software in the control system enables real-time relative positioning of the components to ensure proper formation of the layer.

As noted above, representative polyamic precursors include Skybond-branded materials, such as Skybond 6000 or 8000. An example photo-reactive monomer is N, N-dimethylacrylamide, 4-acrylolmorpholine, 1-vinyl-2-pyrrolidinone, and others. Other monomers that are miscible with the targeted PAA oligomeric precursor may also be used. An example of an appropriate photo-initiator is Omnirad™ TPO, Omnirad 784, and other phosphine oxide-based radical initiators. Further, the photo-reactive monomers may be based upon cationic initiation chemistry as opposed to methacrylate, acrylates, and vinyls typically used in radical initiation chemistry; representative examples include the use of epoxides, polyols, vinyl ethers, cycloaliphatic epoxides, oxetanes, etc. Examples of these chemistries include Celloxide™ 2021P, HBE™ Epoxy, Curalite™ Ox, and the like; appropriate photo-initiators for these cationic photopolymer chemistries include, for example, species such as Lambson™ Spedcure 938, and other sulfonium or iodonium salts capable of photo-cationic initiation.

What is claimed is as follows:

1. A method of making a polyimide (PI) based material, comprising:
    dispersing a polyamic acid (PAA) oligomer and a photo-initiator into a photo-reactive monomer to form a liquid resin, wherein the liquid resin is substantially devoid of any non-photoreactive solvents;
    applying electromagnetic radiation to solidify the liquid resin and to substantially form a PAA-based interpenetrating polymer network (IPN) in which the polyamic acid oligomer is entangled within the network formed by the photo-reactive monomer; and
    thermally cycling the PAA-based IPN to form a PI-based IPN.

2. The method as described in claim 1, wherein the polyamic acid and the photo-reactive monomer in the PAA-based IPN are substantially independent and un-crosslinked.

3. The method as described in claim 1, wherein the photo-reactive monomer comprises one or more photo-reactive components.

4. The method as described in claim 3, wherein the photo-reactive monomer is one of: N,N-dimethyacrylamide (DMAA), and a photo-reactive amine.

5. The method as described in claim 1, wherein a loading of the PAA oligomer in the liquid resin is about 70%.

6. The method as described in claim 1, wherein a wavelength of the electromagnetic radiation is between about 350 nm and 7000 nm and is applied in association with an additive manufacturing operation.

7. The method as described in claim 6, wherein the additive manufacturing operation is a vat photopolymerization.

8. The method as described in claim 1, wherein thermal cycling is at or below one of: 200° C., 250° C. and 300° C.

9. The method as described in claim 8, wherein pyrolysis of a polymer formed from the photo-reactive monomer is avoided.

10. The method as described in claim 1, wherein the IPN is a semi-IPN.

11. The method as described in claim 1, wherein the electromagnetic radiation is one of: deep UV, light UV, visible and near IR.

12. A polyimide (PI) based material manufactured according to the following process steps:
    dispersing a polyamic acid (PAA) oligomer and a photo-initiator into a photo-reactive monomer to form a liquid resin, wherein the liquid resin is substantially devoid of any non-photoreactive solvents;
    applying electromagnetic radiation to solidify the liquid resin and to substantially form a PAA-based interpenetrating polymer network (IPN) in which the polyamic acid oligomer is entangled within the network formed by the photo-reactive monomer; and
    thermally cycling the PAA-based IPN to form a PI-based IPN.

* * * * *